US007512520B2

(12) United States Patent
Sack et al.

(10) Patent No.: US 7,512,520 B2
(45) Date of Patent: Mar. 31, 2009

(54) METHOD FOR LOGGING THE PERFORMANCE OF A VEHICLE SUSPENSION SYSTEM

(75) Inventors: Roger Philip Sack, Mt. Tamborine (AU); Peter James Doust, Eastwood (AU)

(73) Assignee: Tramanco Pty Ltd., Rocklea, Queensland (AU)

( * ) Notice: Subject to any disclaimer, the term of this patent is extended or adjusted under 35 U.S.C. 154(b) by 0 days.

(21) Appl. No.: 10/563,032

(22) PCT Filed: Aug. 19, 2004

(86) PCT No.: PCT/AU2004/001107

§ 371 (c)(1),
(2), (4) Date: May 11, 2006

(87) PCT Pub. No.: WO2005/016723

PCT Pub. Date: Feb. 24, 2005

(65) Prior Publication Data

US 2006/0259220 A1    Nov. 16, 2006

(30) Foreign Application Priority Data

Aug. 19, 2003   (AU) ............................... 2003904423

(51) Int. Cl.
*B62D 55/104*   (2006.01)
*G06F 17/40*   (2006.01)
(52) U.S. Cl. ........................ 702/182; 702/173; 702/187; 701/37

(58) Field of Classification Search .................. 702/182, 702/41, 173, 187
See application file for complete search history.

(56) References Cited

U.S. PATENT DOCUMENTS

| 3,877,289 | A | * | 4/1975 | KcKenney et al. | .......... 73/11.07 |
| 4,619,467 | A | * | 10/1986 | Lafferty | ........................ 267/24 |
| 4,936,136 | A | * | 6/1990 | Vanhala | ........................... 73/9 |
| 5,218,546 | A | * | 6/1993 | Bradshaw et al. | .............. 701/37 |
| 5,369,974 | A | * | 12/1994 | Tsymberov | ................. 73/11.08 |
| 5,928,297 | A | * | 7/1999 | Murata et al. | .................. 701/37 |
| 6,360,580 | B1 | * | 3/2002 | Muller | ....................... 73/11.04 |
| 6,389,341 | B1 | * | 5/2002 | Davis | ........................... 701/37 |

FOREIGN PATENT DOCUMENTS

DE          42 26 010 A1      2/1994
DE          4226010 A1   *   2/1994

(Continued)

OTHER PUBLICATIONS

Translation of DE 42 26 010 A1.*

(Continued)

*Primary Examiner*—Hal D Wachsman
(74) *Attorney, Agent, or Firm*—Dennis J. Williamson; Moore & Van Allen, PLLC

(57) ABSTRACT

A method for logging the performance of a vehicle suspension system including the steps of measuring the dynamic effect of an impulsive load with an electronic weighing system, wherein the electronic weighting system is mounted onboard the vehicle, and determining one or more parameters selected from the group consisting of the dampening ratio of the suspension, the oscillation frequency of the suspension and the impact loading of the vehicle.

24 Claims, 9 Drawing Sheets

FOREIGN PATENT DOCUMENTS

ZA          9301540 A    3/1993

OTHER PUBLICATIONS

Sweatman, PF, et al., Ranking of the Road-Friendliness of Heavy Vehicle Suspensions: Low-Frequency Dynamics, Sep. 1994, pp. 1-77, Technical Working Paper No. 13, National Road Transport Commission.

Meriam, J.L., Engineering Mechanics Dynamics, 2006, pp. 602-608, Sixth Edition, Library of Congress Cataloging-in-Publication Data.

Milliken, Paul, et al., Assessing Road-Friendly Suspensions, 2001, pp. 9-85, Transfund New Zealand Research Report No. 206.

Prem, Dr. Hans, et al., Definition of Potential Performance Measures and Initial Standards, Apr. 2001, pp. 1-81, National Road Transport Commission.

Chesmond, C.J., Control System Technology, 1982, pp. 358-369, Senior Lecturer in Control Engineering, Queensland Institute of Technology.

* cited by examiner

METHOD FOR LOGGING THE PERFORMANCE OF A VEHICLE SUSPENSION SYSTEM

This application claims the benefit under 35 U.S.C. § 371 to International Application PCT/AU2004/001107, which claims the priority of Australian Application No. 2003904423 filed Aug. 19, 2003.

FIELD OF THE INVENTION

The present invention relates to vehicle suspension systems and in particular to a method for logging the performance of a vehicle suspension system in reaction to impulsive loads applied thereto.

BACKGROUND ART

Methods for testing the performance of vehicle suspension systems are generally known.

Automotive vehicles commonly employ a suspension system connected between the road wheels and the body of the vehicle.

Conventional shock absorbers typically have a limited operating life, and therefore may need to be replaced when they no longer function properly. In order to determine if a shock absorber needs to be replaced, the simplest and most widely used conventional diagnostic testing approach typically involves a technician applying force to the vehicle fender, or elsewhere on the vehicle body, and visually detecting the rocking movement response of the vehicle. The resulting oscillations are often counted visually or by an oscillation measuring device attached to the vehicle. The conventional suspension testing approach therefore involves subjective interpretation by the technician which may not be consistently reliable.

As can be appreciated, this test cannot feasibly be applied to large vehicles such as road haulage trucks and the like.

Another test which may be applied is the European Drop Test, in which a set of axles is mounted on a test rig and is driven over an inclined ramp with a sheer drop of approximately 80 mm on its facing edge. The damping ratio and frequency of the suspension is then measured using load cells attached to the test rig.

The results gained in the above manners may be inaccurate and inconclusive in that they do not accurately take into account the combined effect of vehicle weight, suspension geometry and shock absorber characteristics as they relate to the efficiency of the shock absorber in maintaining the vehicle's wheel in contact with the road surface having regard to the road bumps which the vehicle normally encounters. Also these simple tests do not take into account multiple axles coupled together in what is commonly called a suspension group, for example, a tandem axle group, tri axle group, quad axle group, and the like.

Other known devices for testing shock absorbers test the dynamic reactions of suspension. Some of these devices require the removal of the shock absorbers from the vehicle. This practice is highly impractical for two reasons. First, labour costs involved in the shock absorber's removal for testing and subsequent reinstallation are prohibitive, in that such costs may be equal to or greater than the cost of replacement shock absorbers. This is particularly true with shock absorbers founded in MacPherson-type suspensions wherein removal of the shock absorber necessitates the disassembly of other suspension components, such as the spring, balljoint and brake assembly.

Second, testing of a shock absorber isolated from its operating environment is believed to be unsatisfactory as its dampening ability is measured against an arbitrary standard rather than relative to the suspension system of which it is a part. As the performance of the shock absorber in conjunction with the rest of the suspension system affects the handling, ride, suspension performance, stability and safety of the vehicle, the practice of shock absorber testing as an isolated component can be seen to be unsatisfactory as a method of determining in-service performance of the suspension, or a suspension group as a whole unit in an operating environment.

As the shock absorber must be removed from the vehicle in order to test it's performance using this test, the vehicle must be removed from service for the length of the tests. This results in a loss of profits for the owner operator while the vehicle cannot be used during the period of downtime.

Other devices currently on the market, namely those operating on the seismograph principal evaluate the suspension systems as a whole, but are restricted to recording movement of the vehicle's body without allowing the deduction of the dampening factor of the system, (i.e., shock absorber performance).

With the advent of the Intelligent Access Project (IAP) under the NRTC guidelines and with the future introduction of Performance Based Standards (PBS), haulage or freight trucks may be called upon to comply with these standards which relate to the performance of suspension and suspension components, as a whole or as a group of axles, so equipped. Under the IAP and the PBS guidelines, the vehicle suspension may be required to meet performance standards in order to maintain the compliance of the vehicle and its fitness for service. This compliance testing may test one or more parameters of the suspension which determine the "road friendliness" of the suspension. A "road friendly suspension" may be one which functions within predetermined limits for one or more of the parameters, and attaining or complying with "road friendliness" may provide advantages for the owner/operator of the vehicle such as the ability to carry heavier loads or access to roads which non-compliant vehicles may be restricted from using. As well, the road friendly performance of the suspension/s will affect the working life of the road itself with attendant reduction in maintenance costs and increased safety to all road users, with the economic benefits of such savings flowing on to the general community.

The compliance of the suspension is generally tested periodically over the life of the vehicle or of the vehicle suspension.

It is therefore desirable to provide for an accurate test procedure for testing the performance of suspension components on a vehicle to determine whether the suspension is functioning properly and within legally acceptable limits while the vehicle is in use and without requiring the removal of the vehicle from service. In addition, it is desirable to provide for a test procedure for testing vehicle suspension components that does not require subjective interpretation by a technician.

SUMMARY OF THE INVENTION

The present invention is directed to a method for logging the performance of a vehicle suspension system, which may at least partially overcome the abovementioned disadvantages or provide the consumer with a useful or commercial choice.

In one form, the invention resides in a method for logging the performance of a vehicle suspension system including the steps of measuring the dynamic effect of an impulsive load with an electronic weighing system, wherein the electronic weighing system is mounted onboard the vehicle, and determining one or more parameters selected from the group consisting of the dampening ratio of the suspension, the oscillation frequency of the suspension and the impact loading of the vehicle.

The method given above is preferably used to test the "road friendliness" of a suspension of vehicles. "Road friendliness" is assessed by the National Road Transport Commission (NRTC), and once a road friendly standard has been attained, the vehicle is generally allowed increased mass limits. The road friendliness of a suspension or suspension group, that is two or more axles connected together for load sharing as defined in the guidelines of the Higher Mass Limits (HML), is generally assessed under the current Higher Mass Limits (HML), currently in force, according to two criteria, namely the damping ratio of the suspension and the frequency of oscillation of suspension in response to an impulsive load.

In order to be considered road friendly, suspensions must have a damping ratio of greater than 20 percent, meaning that the reduction in the amplitude of oscillations which suspension undergoes in response to an impulsive load should decrease by greater than 20 percent each oscillation.

In addition to the required damping ratio in order to be considered road friendly, suspensions should have a frequency of oscillation of less than 2 Hz.

Preferably, components of an electronic weighing system mounted on board the vehicle may be used to measure and/or collect the data used according to the method of the present invention to calculate the damping ratio and frequency of oscillation. Typical electronic weighing systems may comprise at least one load measuring element, usually a load cell or pressure transducer, each associated with one or more suspension component. Each load cell or pressure transducer may also be associated with a signal amplifier. Each signal amplifier may be associated with a central power module and a meter to display the data and/or the collated results of the tests performed.

According to a particularly preferred embodiment, the signal amplifiers used according to the present invention may be "smart" amplifiers. These amplifiers may be capable of storing the results of calibration testing produced according to the invention. In this way, the calibration results are stored in each "smart" amplifier associated with each load cell or pressure transducer and are therefore not dependent on information storage in the meter.

The meter may preferably include a display, generally located in the cabin of the vehicle allowing review or the data or results by a driver. The meter may also be associated with one or more remote display units and/or meters such as a computer allowing review of the information gathered according to the method of the present invention, from a location remote from the meter located in the cabin of the vehicle.

Preferably, each suspension component may be provided with a load cell or pressure transducer. Accordingly, a central meter may be provided to which all load cells or pressure transducers transmit the data. Such transmission may be along cabling or may be wireless transmission of data.

Suitably, the meter may be a multi-channel meter capable of receiving information from up to eight or more channels. Preferably each of the channels may receive data from an axle grouping. Further, up to eight or more load cells and/or pressure transducers may provide information to the meter on each channel. Therefore, a single meter may be capable of receiving and recording information from a total of up to at least 64 load cells or pressure transducers.

Each meter or system may preferably comprise an onboard storage device either built into the system or attached thereto such as a data log/logger which suitably receives and records all information from all associated load cells or pressure transducers. The data log/logger may preferably allow the tracking of the information collected according to dates, times, and particular dynamic parameters such as G-force and time, both of which can be either pre-set or varied to suit particular operating conditions and/or test conditions which may be varied to allow/achieve certain or specific data, according to either the owner's interests or that of a particular authority or body who has a right to such information. Accordingly, all data collected may be provided with an identification code allowing the tracking of the data.

Typically, the meter from a single vehicle may be capable of communication with a tool for analysis of the collected information, the analysis tool may be on-board either as a separate tool or built in to the system. In order to transmit and/or receive the information, the meter or system in general, may be provided with a means for transmitting and/or receiving information. The means for transmitting and/or receiving information may preferably be in the form of an interconnecting cable, radio frequency data link, a telephonic link or any other type of the means for transmitting and receiving information.

According to the present invention, each vehicle utilising the method of the present invention may be provided with a vehicle locating means. According to a particularly preferred embodiment, the vehicle locating means may preferably be a satellite global positioning system. However, other locating means, such as trip meters, may be used according to the invention.

The method may utilise one or more remote interrogation units adapted to allow remote access to the meter provided in a vehicle. The remote interrogation units may allow the viewing and/or analysis of information collected on a real time basis, or on a later time basis, that is, at the discretion of the operator or the body requiring such data.

According to a first particularly preferred embodiment of the invention, the performance of the vehicle suspension system is logged over a standard or specific road section at different times. This performance logging may be termed an "axle test". The purpose of the axle test may be to test the performance of an individual axle or group of axles to an impulsive load and compare the results of the performance to the standards specified for road friendliness. The axle test may be performed when the suspension is new in order to establish compliance with the road friendliness criteria and to act as a reference to measure the suspension or suspension group's compliance and wear over a period of time.

The axle test may be conducted at various periods throughout the life of the suspension in order to ensure that the performance of the suspension remains within the accepted standards. The axle test may be conducted while the vehicle is in service and therefore may be termed "in service compliance" testing. Each of the parameters may be calculated from the data collected during any or all of the tests.

The axle test may comprise a step test in which a specified height step downward is used to create a negative step input to the vehicle suspension for the purpose of determining damping ratio and fundamental frequency of axle-to-body bounce of the suspension. The step test may be conducted over a predetermined height step and also at a predetermined speed of passing over the step. The method may further allow the adaptation of the data to allow for differences in the speed and height of the step when calculating the tested parameters.

A second test which may suitably be used in axle testing is a bump test. This test may generally comprise a series of tests performed by driving a combination test rig vehicle over a nominal 50 mm bump (or other predetermined dimension) at approximately 5 km/h or at some other speed, as deemed necessary. The bump may extend upwardly or downwardly and may provide an approximation to a positive impulse signal applied to the suspension of the combination test rig vehicle.

A third test which may be performed may be a road test. According to this test, the variation in the mass signal may be recorded as the combination test rig vehicle travels along a normal, uneven road at speed. The speed may be up to 60 km/h or may be higher or lower if required. The GPS location device may be linked to the data collected, to precisely locate the portion of road upon which the test was conducted for future comparison of the test conditions as well as the road condition to determine the degradation in either or both.

Any one or more of the three tests described above may be conducted in order to assess the performance of the suspension as well as the condition of the road itself.

According to a second particularly preferred embodiment of the invention, the performance of the vehicle suspension system is logged over a variable road section at different times, the position of the vehicle being identifiable at all times during the logging process.

This testing procedure may be termed a "trip test". The trip test may preferably allow data to be collected about the condition of the roads which a test vehicle travels over whilst gathering data in the form of the axle test for analysis, at the same time. Each trip test may be expanded into a series of axle tests for such purposes. For example, an impulsive load may be imposed on the suspension if the test vehicle drives over a pothole in the road. If a test vehicle uses the same route, it would generally traverse the same pothole on different trips. By assessing the performance of the suspension in response to the impulsive load applied to the suspension on different trips, a user may determine whether the pothole is getting larger or deeper or whether it has been repaired or not.

The trip test may be triggered by the application of a particular preset magnitude impulsive load. The test may further require that the location of the vehicle be ascertainable with precision. This may be accomplished using locating means such as GPS devices linked to the system. Upon triggering the trip test, the system may begin to record the performance of the suspension and the position of the vehicle when the test was triggered.

Suitably, the method of the present invention may be utilised to collect and analyse data in order to log the performance of the suspension of a vehicle. Individual components of the suspension may be tested or groups of components may be tested. The system allows the logging of information relating to the dynamic effect of impulsive loads applied to suspensions and the compliance of the suspension to parameters adapted to ascertain the effectiveness of the suspension in dampening the impulsive load applied.

BRIEF DESCRIPTION OF THE DRAWINGS

Various embodiments of the invention will be described with reference to the following drawings, in which.

DETAILED DESCRIPTION OF THE INVENTION

According to an aspect of the invention, a method for logging the performance of a vehicle suspension system in reaction to impulsive loads applied thereto is provided.

Generally, trucks and trailers and other heavy haulage vehicles are equipped with self-levelling suspension systems. The systems are designed to compensate for changes in the load by modifying the springing or dynamic characteristics of the suspension so that the vehicle(s), always remain approximately the same height off the road, whether empty, partially loaded, or fully loaded.

The systems are designed to ensure that, even when the vehicle is fully laden, the full upward travel of the suspension system is available for absorbing bumps. Other related effects are things such as the headlights are kept in proper focusing alignment, whatever the distribution of the load.

Any form of self-leveling is generally operated by one or more load-sensing devices which measure the vertical distance between, for example the trailer bed and the suspension arm. The greater the load, the smaller this distance tends to become. An initial variation in the distance operates a valve which controls the height-adjusting system. Usually, height adjustment takes place at both ends of vehicle, and in particular generally takes place at each axle or group of axles.

Air suspensions are relatively simple in principle. Collapsible, pressurized air containers take the place of conventional springs or shock absorbers; the upward movement of the wheel reduces the volume of the air spring, raising its pressure, so that it tries to extend itself again. If the air spring is inflated more, it can carry a heavier load before contracting to a given height. A height-control valve connects the air spring to a high-pressure air reservoir when the load is increased, and pressure is released through the valve to the atmosphere when the load is reduced.

Air suspensions generally also comprise dampers, often referred to as "shock absorbers". Dampers are designed to damp out vibrations so that the suspension does not continuously bounce up and down in response to an impulsive load. The purpose of dampers is to reduce oscillation by absorption of energy stored in the suspension. A damper may be single action or double action in which damping is controlled in both directions.

Figure 1:
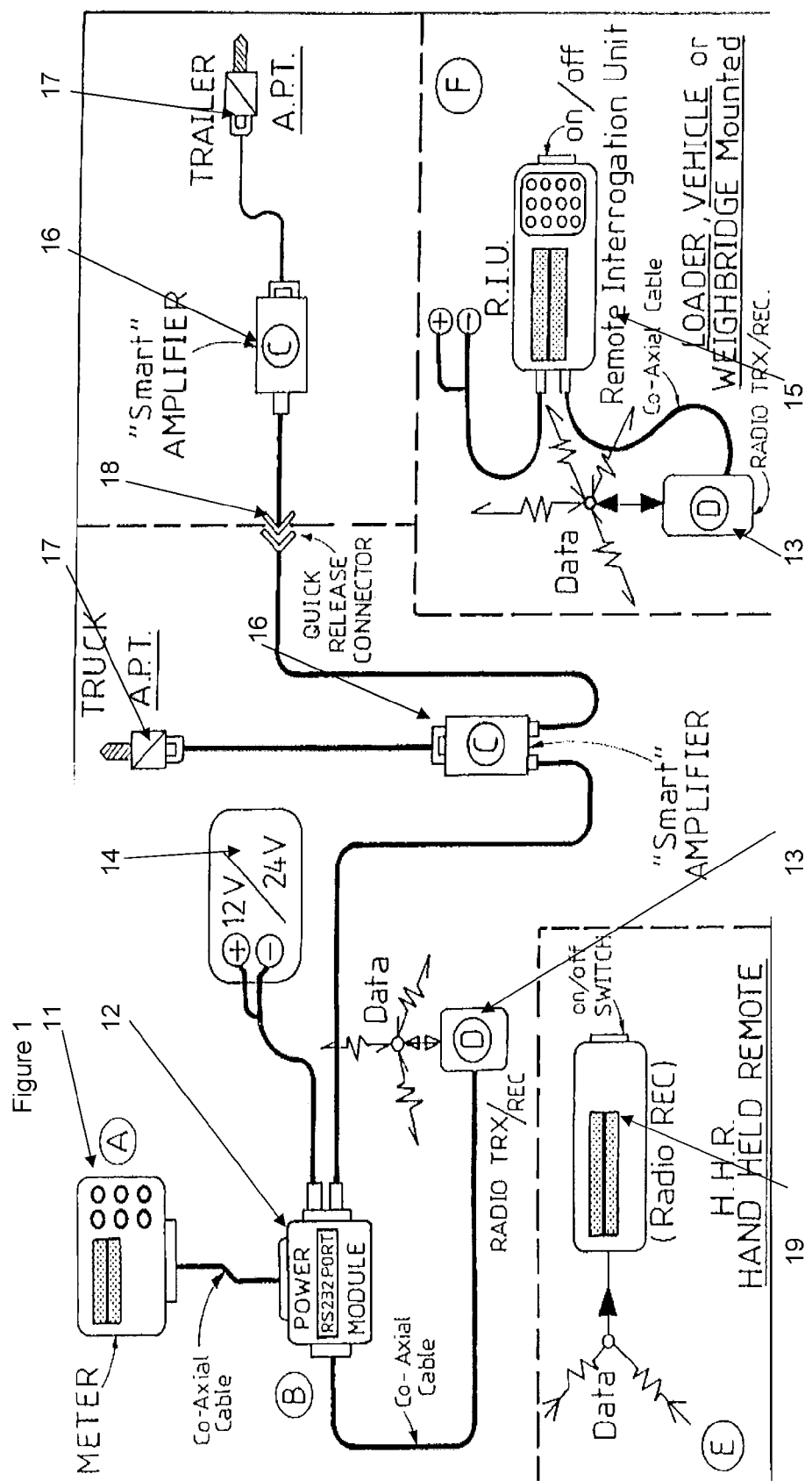
FIG. 1 is a schematic illustration of a typical installation of air suspension on an articulated vehicle such as a truck and trailer according to an embodiment of the invention.

A typical installation of the components of air suspension on an articulated vehicle such as a truck and trailer, which are also used according to the method of the present invention, is illustrated in FIG. 1.

In order to control the air suspension system, the system has a meter 11 connected to a power supply 12 for the system usually including a battery 14. The meter 11 is also associated with a data transmitter/receiver 13 which is capable of transmitting data which is captured by the system to a remote location and receiving data and/or commands from a remote source. An example of a remote interrogation unit 15 is also illustrated in FIG. 1. This unit is adapted for use to query the meter 11 onboard the truck when the truck is moving. Generally, radio frequency waves are used as a carrier signal to accomplish the data transfer.

The system also has at least one and generally more than one smart amplifier 16 each associated with an air pressure transducer (APT) 17, or load cell or combinations of these, to acquire information regarding the gross and nett weights of the vehicle. Each pressure transducer 17 is associated with a component of the vehicle suspension. Generally, each APT 17 is associated with an air spring which is associated with an axle. Each APT 17 provides feedback to the meter 11 regarding the response of the suspension to an impulsive load by measuring the movement of the suspension.

As stated above, each axle is generally provided with an APT 17 so that the movement at each axle in response to an impulsive load may be monitored. The meter 11 and power module 12 are generally located in the truck or prime mover of the vehicle. These components are directly connected to the each APT 17 associated with the truck axles.

The APT's 17 and the associated smart amplifiers 16 which monitor the trailer axles are connected to the meter 11 and power module 12 on the truck using a quick release connector 18 so that different trailer may be connected to the one prime mover without loss of monitoring functions.

Providing the system with a handheld remote transceiver 19 allows the vehicle operator to remain safe distance from the vehicle while the vehicle is being loaded and still monitor the weights displayed on the remote receiver 19. Examples of some of the information which may be collected include gross weight, net weight, load pick up and delivery, front end weight, rear end weight, weight distribution, and mass management and suspension compliance testing.

Figure 2:
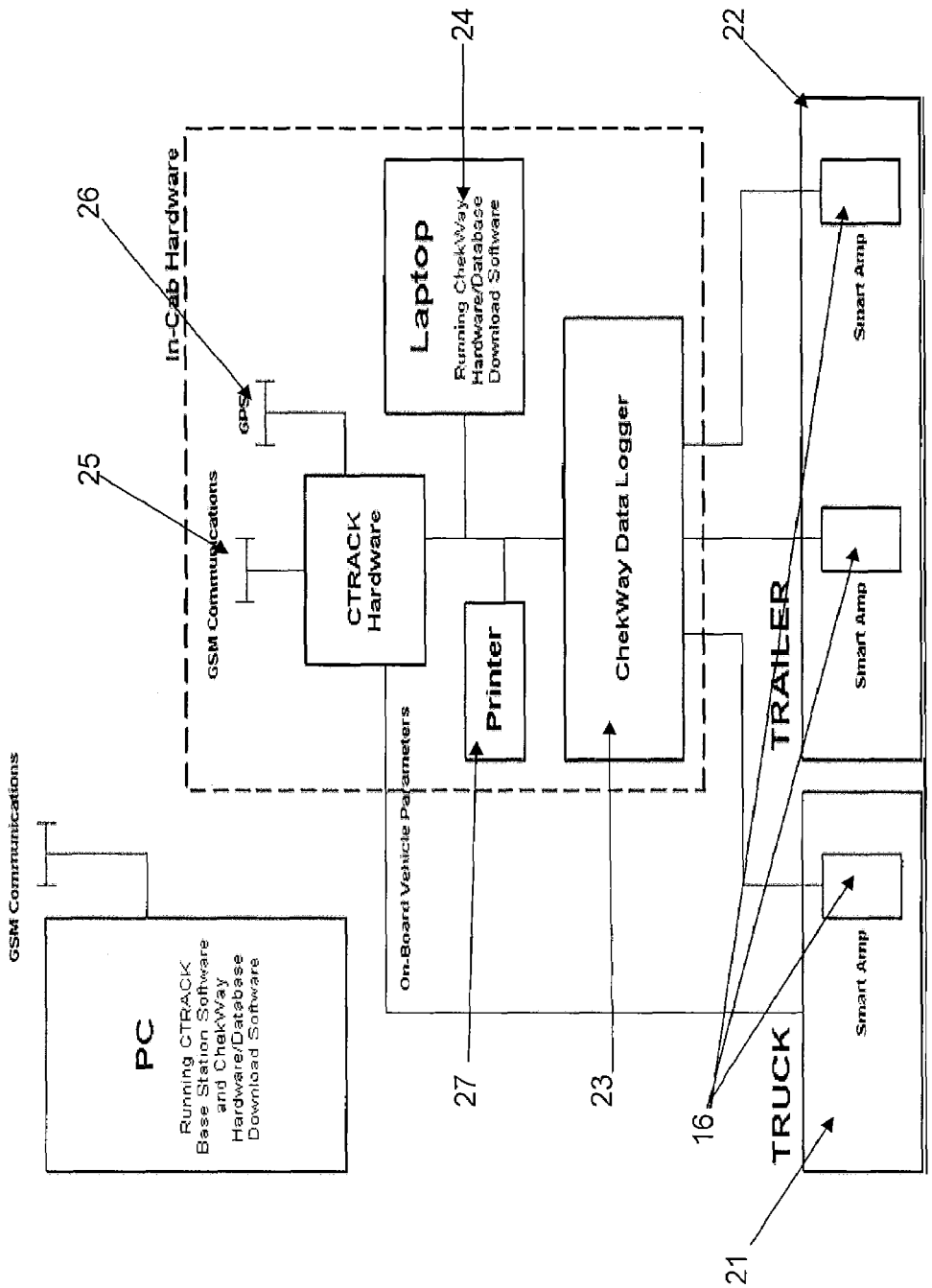
FIG. 2 is a schematic illustration of a typical installation of a system according to an aspect of the present invention on an articulated vehicle such as a truck and trailer.

The schematic layout of the components of the suspension system and electronic weighing system which is used to implement the method according to the present invention is illustrated in FIG. 2.

The truck 21 and trailer 22 are shown with smart amplifiers 16 in place. Each smart amplifier 16 is associated with the in-cab hardware which allows a driver to monitor the performance of the suspension system of the truck and trailer combination which they are driving.

The smart amplifiers 16 are connected to a data logger 23. The data logger 23 is responsible for capturing and collating all of the information transmitted from the smart amplifiers 16 and the associated APT's.

The data logger 23 is in turn associated with a computer 24 which is responsible for the use of the raw information collected to create useable information regarding the parameters of the suspension which are to be monitored or tested. The system is also provided with a means to transmit and/or receive data or commands to and from a remote location 25, together with a locating means such as a GPS locator 26. The analysis of the information collected may take place at a remote location and the results transmitted back to the vehicle.

In use, the system collects weight information from air pressure transducers 17 connected to air bag suspensions, and/or load cells mounted on the vehicle. The information is then sent to the meter 11 where it is displayed in kilograms of weight applied at each individual axle or group of axles, as well as total weights. This allows the operator to check the weights on each axle group being used, as well as the axle group combinations and total weights as required on a display associated with the meter 11.

All information is date and time stamped and can be downloaded to a laptop 24 or a printer 27 in order to produce a hard copy on demand. All data is stored in an associated data log 23 which cannot be deleted without a specific set of instructions (and password) from the operator.

The applicants have subjected the system and method to testing and analysis of the air suspension of a newly constructed, 34 tonne, four-axle trailer. The analysis is compared with the European Union (EU) requirements for "road-friendly suspensions" on heavy vehicles. Feasibility of determining road-friendliness of air suspensions for heavy vehicles without recourse to laboratory or workshop facilities was also explored.

The Truck & Trailer Test Rig

The truck was a standard KENWORTH® prime mover with air suspension on the drive axles coupled to a 4-axle trailer with air suspension. This is an innovative vehicle which meets all but one of the 20 Performance Based Standards (PBS) as proposed currently by the National Road Transport Commission (NRTC) specifications.

The trailer was built by O'Phee Trailers and the combination is owned and operated by a commercial carrying service. The truck/trailer combination has been on the road since mid-February 2003 operating under permit. One of the conditions of the permit was that the vehicle was to be monitored for mass and position. The Gross Combination Masses (GCM) permitted is dependant on the position of the combination test rig. The freight task is general freight/general access when the GCM is not to exceed 42.5 tonne which is described as Higher Mass Limits (HML) and the GCM is not to exceed 50 tonne on a particular route between Acacia ridge and Lytton in Brisbane.

The combination rig was tracked using Global Positioning System (GPS) position fixes from a C-Track GPS reporting system relayed back to a base station at the premises of Digicore Pty Ltd, a third party service provider which compiled and stored the data. The C-Track system reports every hour via a mobile phone link. The report contains the position of the vehicle at various intervals on a real time basis. The prime mover was equipped, before this trial, with the GPS reporting system for fleet management purposes.

Mass data from the drive axles of the prime mover and the trailer group is measured indirectly, but proportional to, air pressure in the high pressure air lines to the air suspension. Air pressure is converted to a mass signal by a mass measurement system which sends the mass signals to the C-Track system as well as displaying the mass of the prime mover and the trailer on a display in the cabin. For the trailer, 40 kg increments have been assigned to the digital mass measurement by the mass measurement system. The mass on the prime-mover is determined by the mass measurement system apportioning a mass value to the steer axle and adding this to the measured value of air pressure on the drive group axle air line, proportional to the mass on that group.

It is cheaper to instrument air suspensions than steel suspensions. To contain capital outlay, only the drive & trailer axle groups were instrumented and so the steer axle was not instrumented to measure mass. However, the geometry of the combination ensured a fairly constant mass on the steer axle. The trailer has a YORK® control system which raises the front axle when the trailer is empty and drops the axle when a load is on board.

For the purpose of the testing, a container with freight weighing approximately 11 tonne was loaded onto the trailer.

The Tests Applied

The Step Test

The yard of the freight operator presented an ideal opportunity to replicate the EU step test. The EU test uses an 80 mm step down to create a negative step input to the vehicle suspension for purposes of determining damping ratio and fundamental frequency of axle-to-/body bounce.

A new warehouse was being built in the yard of the freight operator and the slab was finished, awaiting the superstructure. This slab was 65 mm above the surrounding surface of the yard manoeuvring apron. For one series of tests, the combination test rig was driven off the warehouse slab onto the apron at approximately 5 km/h.

The Bump Test

A second series of tests was performed by driving the combination test rig over a 50 mm nominal diameter pipe at approximately 5 km/h. The pipe had a bar welded to either end to prevent rotation as the tyres moved over it. The pipe provided an approximation to a positive impulse signal applied to the suspension of the combination.

The On-Road Test

A final test was performed by driving the combination test rig over some roads near the freight depot. The variation in the mass signal was recorded as the combination test rig traveled along normal, uneven roads at speeds up to 60 km/h.

The Results

The Step Test

Figure 3:
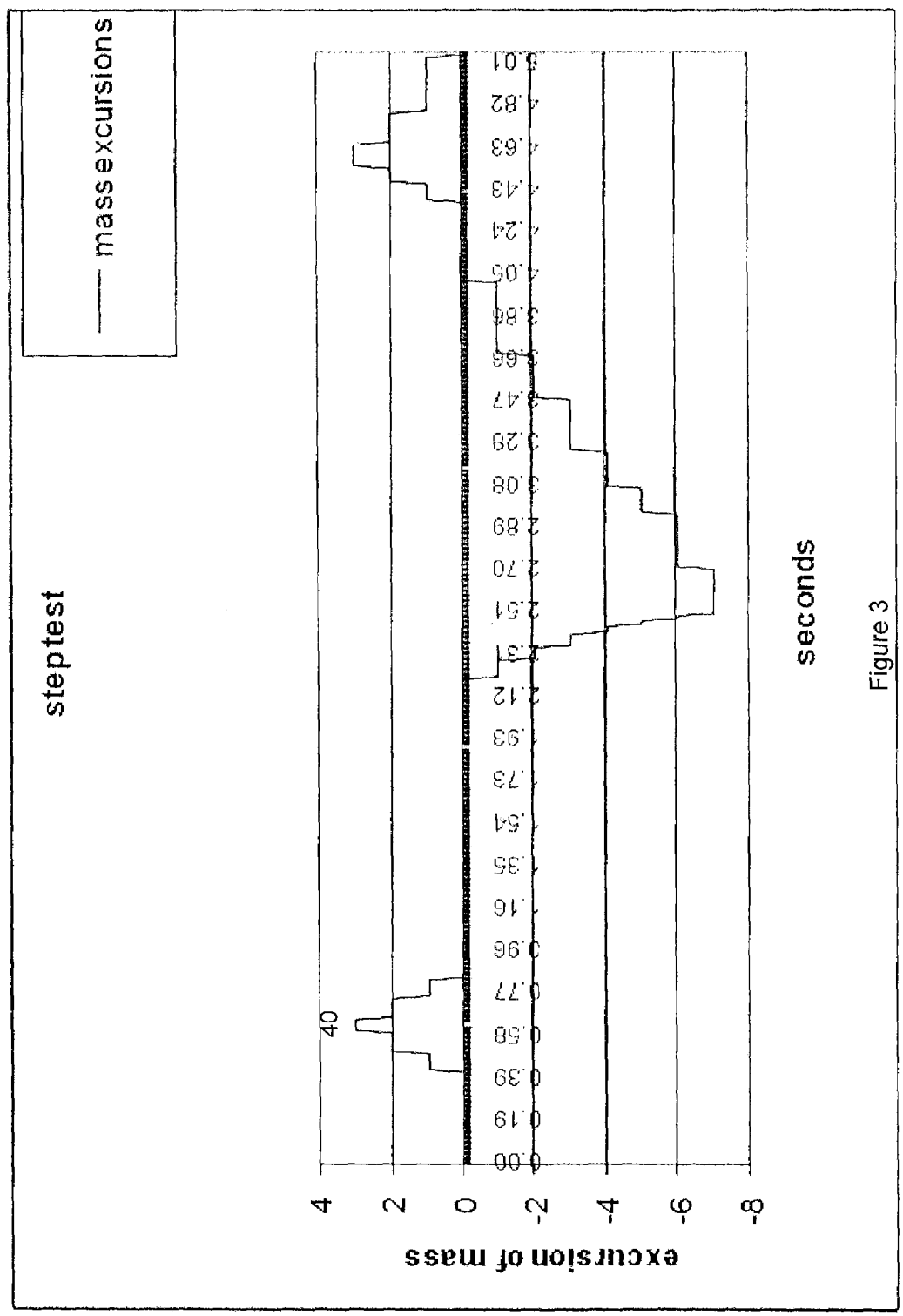
FIG. 3 is a graphical representation of a test signal returned during a step test conducted using the system according to an aspect of the present invention.

The step test results plotted in FIG. 3 show that the signal is varying slowly and gives a shape that could not be analysed easily/meaningfully. FIG. 3 shows the test signal as measured for the first 2 axles, the first axle signal on the left 40 and the entirety of the signal on the right (from 2.25 s to beyond 4.92s) is from the second axle. The other 2 axles produced a similar shape to axle 1 and have not been included for brevity.

The Bump Test

Figure 4:
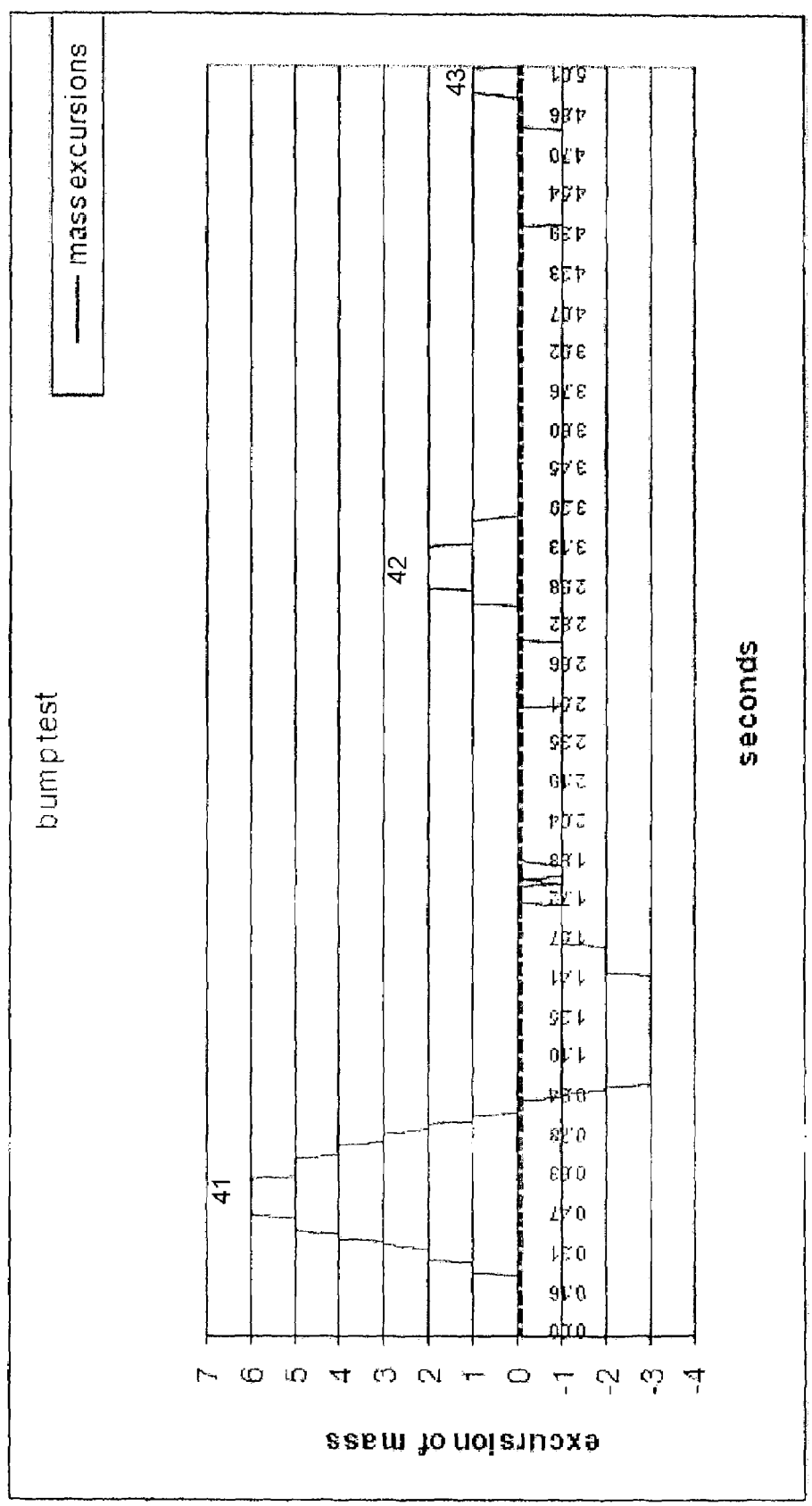
FIG. 4 is a graphical representation of a test signal returned during a bump test conducted using the system according to an aspect of the present invention.

The bump test yielded data that lent itself to more meaningful analysis and this data is shown in FIG. 4. The three signals caused by the tyres from the $2^{nd}$, $3^{rd}$ and $4^{th}$ axles travelling over the pipe are shown in the Figure from left to right (41, 42, 43) respectively.

The second axle created the first excursion on the left of the graph. The signal generated by the first axle perturbation is not plotted here as it was similar to the two caused by axles 3 and 4, shown as the other two positive excursions in FIG. 4.

The On-Road Test

The variation in the mass signal from the trailer axle group was of primary interest for this evaluation. A sample of how the data appears in hexadecimal format, this example from the on-road test appears below.

89 88 87 86 84 83 81 00 02 04 07 09 0C 0E 2A 02 05 07 09 0B
0C 0D 0D 0D 0D 0D 0D 0D 0D 0C 0B 09 07 05 03 01 00 82
84 86 89 8B 8D 8F 88 81 83 85 86 87 89 89 8A 8B 8B 8B 8B
8B 8B 8B 8B 8B 8B 8A 89 87 86 84 82 00 02 04 07 0A 0D 23
02 05 08 0A 0C 0D 0D 0E 0D 0D 0D 0D 0D 0D 0D 0C 0C 0A
08 06 04 02 00 82 85 87 8A 8C 8E 80 82 84 85 87 89 8A 8B
8B 8C 8C 8C 8C 8C 8C 8C 8B 8A 89 88 87 85 83 81 00 03 05
08 0B 0E 27 02 05 07 09 0A 0A 0A 0A 0A 0A 0A 09 09 09
07 06 04 02 00 81 83 86 88 8B 8D 8F F4 82 84 85 87 89 89
8A 8A 8B 8B 8B 8B 8B 8B 8B 8A 89 88 87 86 84 83 81 00
02 05 08 0A 0D 0F 26 02 03 05 06 07 07 07 07 07 07 07 06
05 04 02 00 81 84 86 88 8A 8D 8F 84 81 83 85 86 88 89 8B
8C 8C 8D 8D 8D 8D 8D 8D 8D 8D 8C 8B 89 88 86 84 82
00 01 04 06 09 0B 0E 24 02 04 06 07 09 09 09 09 09 09 09
08 08 06 05 03 00 81 83 86 88 8B 8D 8F F6 82 83 85 86 88
89 8A 8B 8B 8B 8B 8B 8B 8B 8B 8B 8B 8A 88 87 85 84 82
00 01 04 06 09 0C 0E 1D 02 04 05 06 07 07 07 07 07 07 07
07 06 05 04 03 01 00 81 83 85 87 89 8B 8D 8F F3 81 83 85
86 87 89 89 8A 8A 8A 8A 8A 8A 8A 8A 8A 89 88 86 85 83
82 00 02 04 06 09 0B 0E 0E 02 04 05 07 08 08 09 09 08 08 08
08 07 06 04 02 00 81 84 86 89 8B 8D 8F E0 81 83 85 86 87
88 89 89 89 89 89 89 89 89 89 88 87 86 85 83 82 00 01 03 05
08 0A 0D F4 02 04 06 08 09 0A 0B 0B 0A 0A 0A 0A 0A 09
07 05 03 01 81 83 85 88 8A 8C 8E E4 81 83 84 85 85 86 86
86 86 86 86 86 86 86 85 85 84 83 82 81 00 01 02 04 05 07 09
0B 0D 0F 16 02 04 05 07 08 09 09 09 09 08 08 08 07 06 04 03
01 81 83 85 87 8A 8C 8E 85 81 83 84 85 86 87 88 88 88 88 88
88 88 88 88 88 88 87 86 85 84 82 81 00 01 03 05 07 09 0C 0E
0F 35 01 02 03 04 04 04 04 04 04 04 03 03 02 00 00 82 84 86
88 8A 8C 8E 8F 8B 81 83 84 85 87 88 88 89 89 89 89 89 89
89 89 89 89 88 88 87 86 85 83 82 00 00 02 04 06 08 0A 0C 0E
1C 01 03 04 04 05 05 05 04 05 05 04 04 03 02 00 81 83 85 87
89 8B 8D 8F F7 81 83 84 85 87 88 89 8A 8A 8A 8A 8B 8B 8B
8B 0F B8

Figure 6:
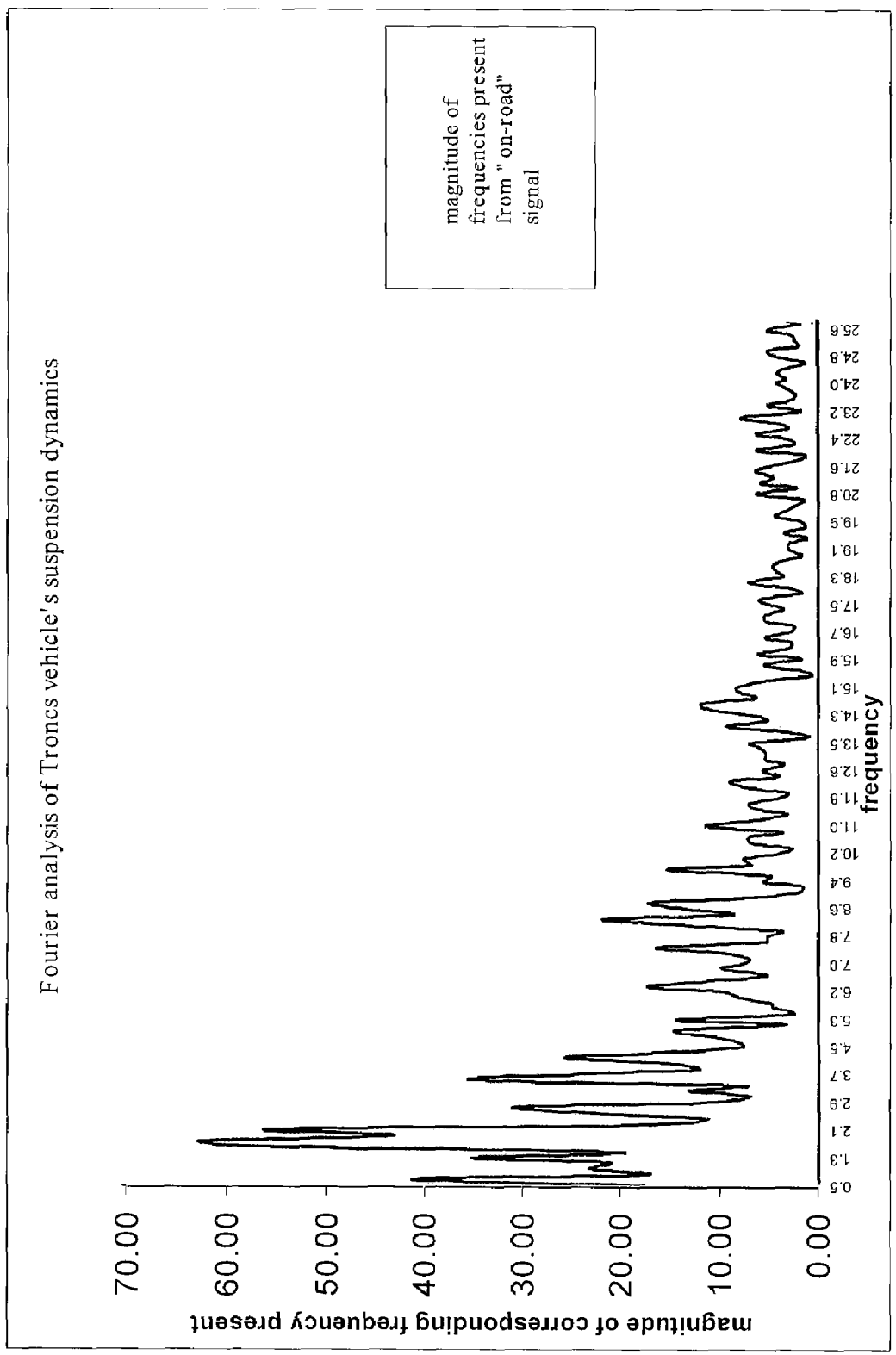
FIG. 6 is a Fourier plot of a trailer axle group mass signal returned during testing conducted using the system according to an aspect of the present invention.

The data from the tests was converted and a plot of the variation in mass induced by the dynamic forces on the combination was produced as FIG. 6.

Analysis

The Step Test

The step test did not yield any data that could be analysed in a meaningful way. It is noted that the EU test differs from the step test conducted in that it is usually conducted at a much a higher speed than those used for this testing, it is done for one axle only and the drop is 80 mm, not 65 mm as used for this testing. The applicants surmise that the effect of the air lines equalising the pressure differential between the air bags on differing axles caused the signal to behave in the manner shown in FIG. 3, particularly for axle 2. It was thought that the 3 axles were restraining the first axle in the vertical plane as it went over the step but when the second axle encountered the step the applicants thought that that was the point of equilibrium of the axle group and the group then teetered like a see-saw, giving the resultant aberrant signal. The applicants also surmise that this was why the EU test was performed with only one axle and at relatively higher speeds.

The Bump Test

By taking the absolute values the data from the first perturbation in FIG. 4, that is, the first and third excursions of the mass signal, the damping ratio ($\zeta$) may be determined using the formula:

$$\zeta = \delta/\sqrt{(\delta^2 + (2\pi)^2)}$$

where $\delta$ is the standard logarithmic decrement given by the following:

$$\delta = \ln\left(\frac{A_1}{A_2}\right)$$

and $A_1$=amplitude of the first peak 44 in the plot of the absolute value of the response and $A_2$=amplitude of the third peak 45 in the plot of the absolute value of the response.

Figure 5:
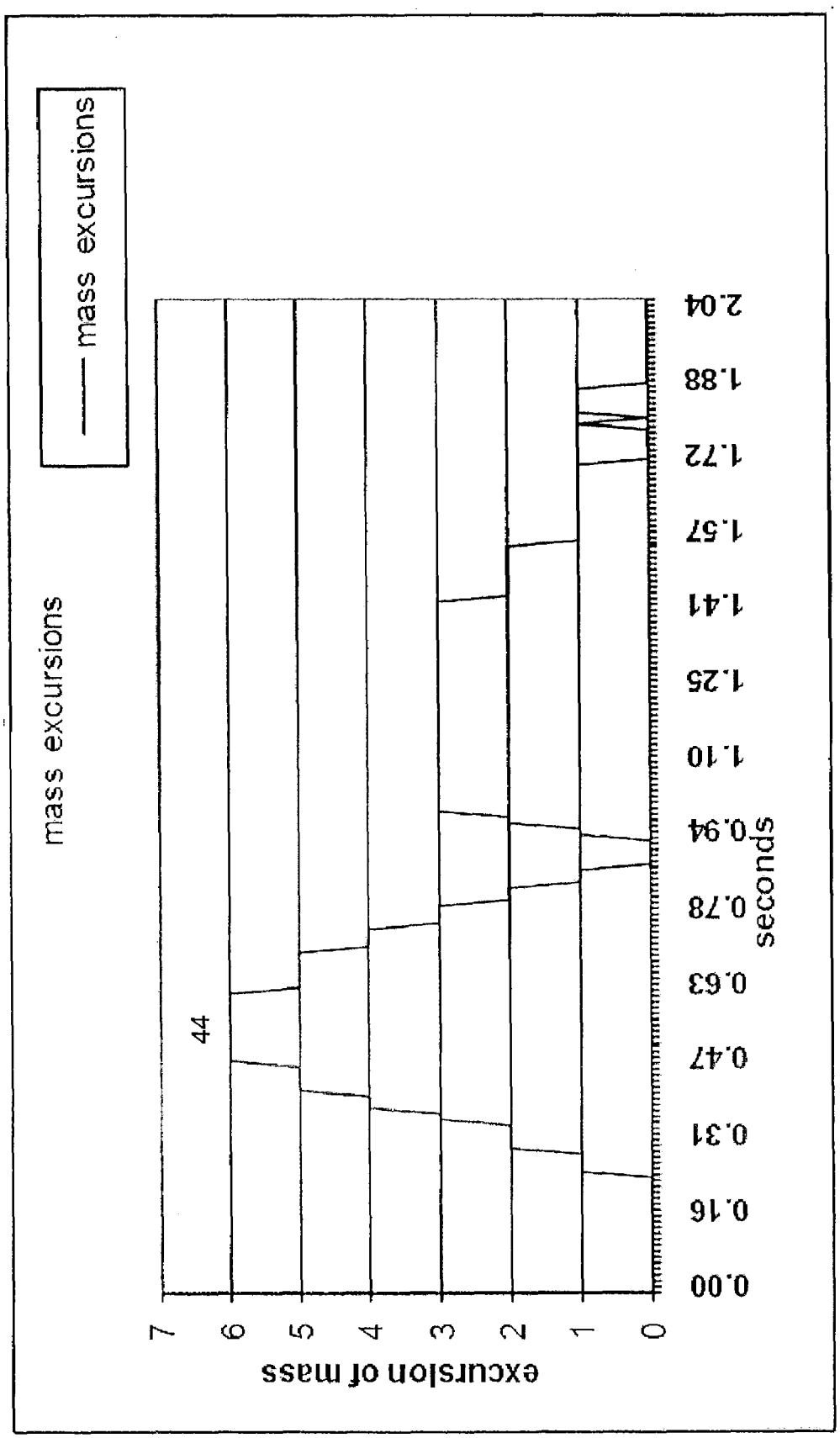
FIG. 5 is a graphical representation of the absolute value of the test signal returned during a bump test plotted against time conducted using the system according to an aspect of the present invention.

From FIG. 5, it can be seen that the value of $A_1$=6 and $A_2$=1. It is noted that these values are the closest approximation to the actual values measured by the mass measurement system given the approximately 1000 digitisation steps over the measurement range of 40 T: (40000 kg/1000=40 kg increments).

Substituting the measured values of $A_1$ and $A_2$ yields a damping ratio ($\zeta$) of 0.27 or 27%, allowing for the error described above.

The EU Standard is 20% or greater so it can be seen that this trailer meets the EU Standard for "road-friendly suspension" dampers. Further, this exercise shows that, by using a simple test of driving over a 50 mm pipe and analysing the data provided by the on-board mass measurement system, the damping ratio may be determined by simple calculation.

The On-Road Test

By subjecting the data from the on road test to Fourier analysis, the system is able to determine the trailer's body-to-axle-group frequencies induced by the dynamic forces on the combination. For this analysis, it was assumed that the signal derived from driving the vehicle on normal roads approximated to a random signal. Fourier analysis of an output, or derived, signal after it has been generated from a random input signal of uniform amplitude to any system allows determination of the transfer function of the system as expressed by the frequencies present in the output signal.

The plot illustrated in FIG. 6 is a Fast Fourier Transform (FFT) that is, by definition, lumpy and does not yield pure and clean plots on the magnitude axis. Even allowing for the overall noise created by the FFT process, it can be seen that the greatest frequency magnitude 46 present in the FFT of the on-road signal is that of 1.5 Hz-2 Hz. Given that the EU standard for body bounce is >2.0 Hz, it is statistically probable that this parameter is met by the suspension tested and reflected on this plot. It is to be noted that some lower frequencies appear to be present and that there are greater magnitude frequencies at approx. 4 Hz, 8 Hz and 15 Hz. Axle hop appears to be the explanation for the 15 Hz signal. Further research is needed for the 4 & 8 Hz signals.

Figure 7:
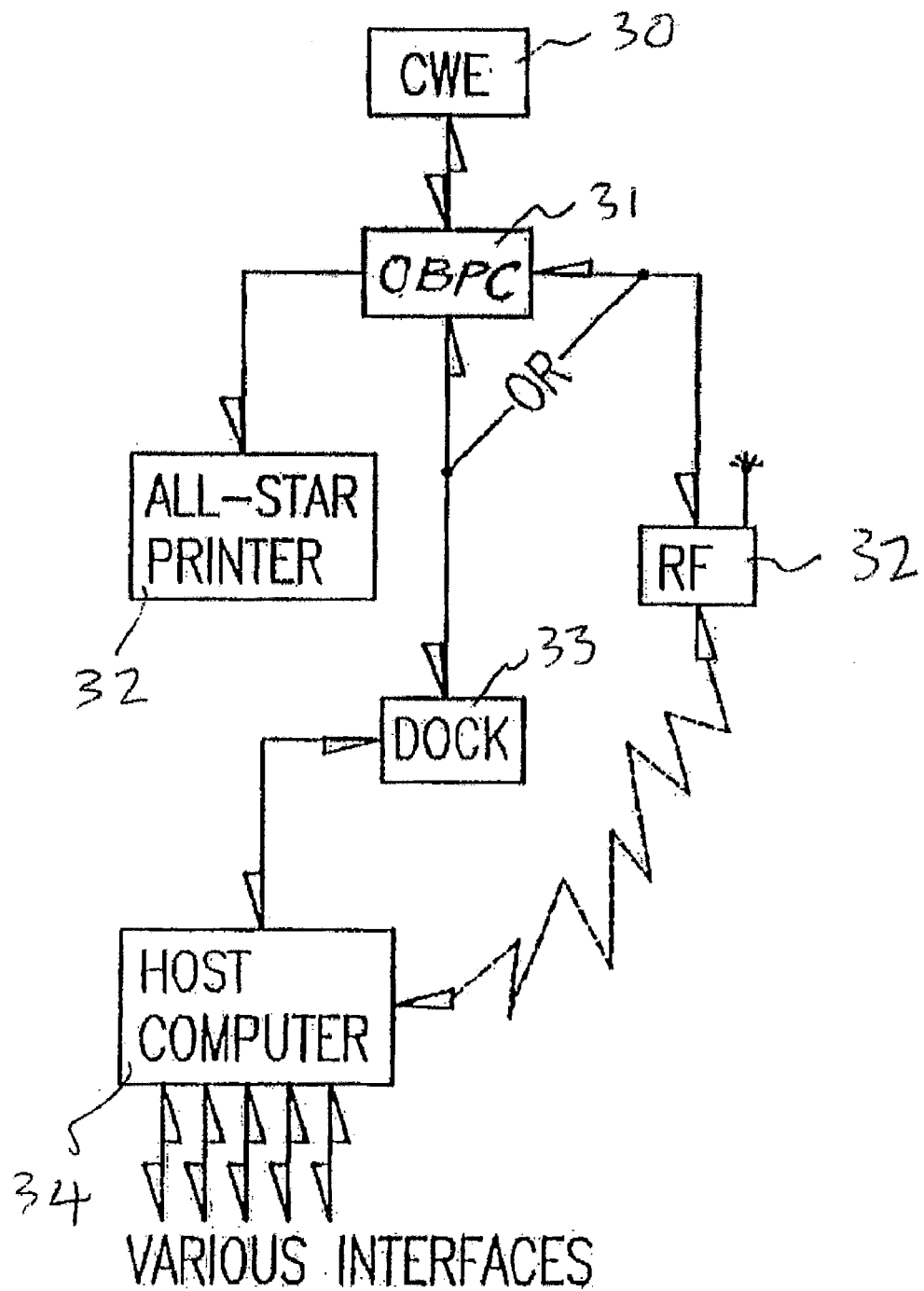
FIG. 7 is a schematic block diagram of a system of the invention shown coupled to other components for facilitating the downloading of data from the system of the invention.

FIG. 7 shows a system 30 of the invention coupled to an on-board personal computer (OBPC) 31, OBPC 31 is connected to an RF transmitter 32. Transmitter 32 allows data from the system 30 to be downloaded via a radio link. A printer 32 is connected to the OBPC 31. A docking station 33 allows a host computer 34 to be coupled to the OBPC 31 or devices other than a computer 34 to be connected to OBPC 31. Computer 34 may download data from the system 30.

Figure 8:
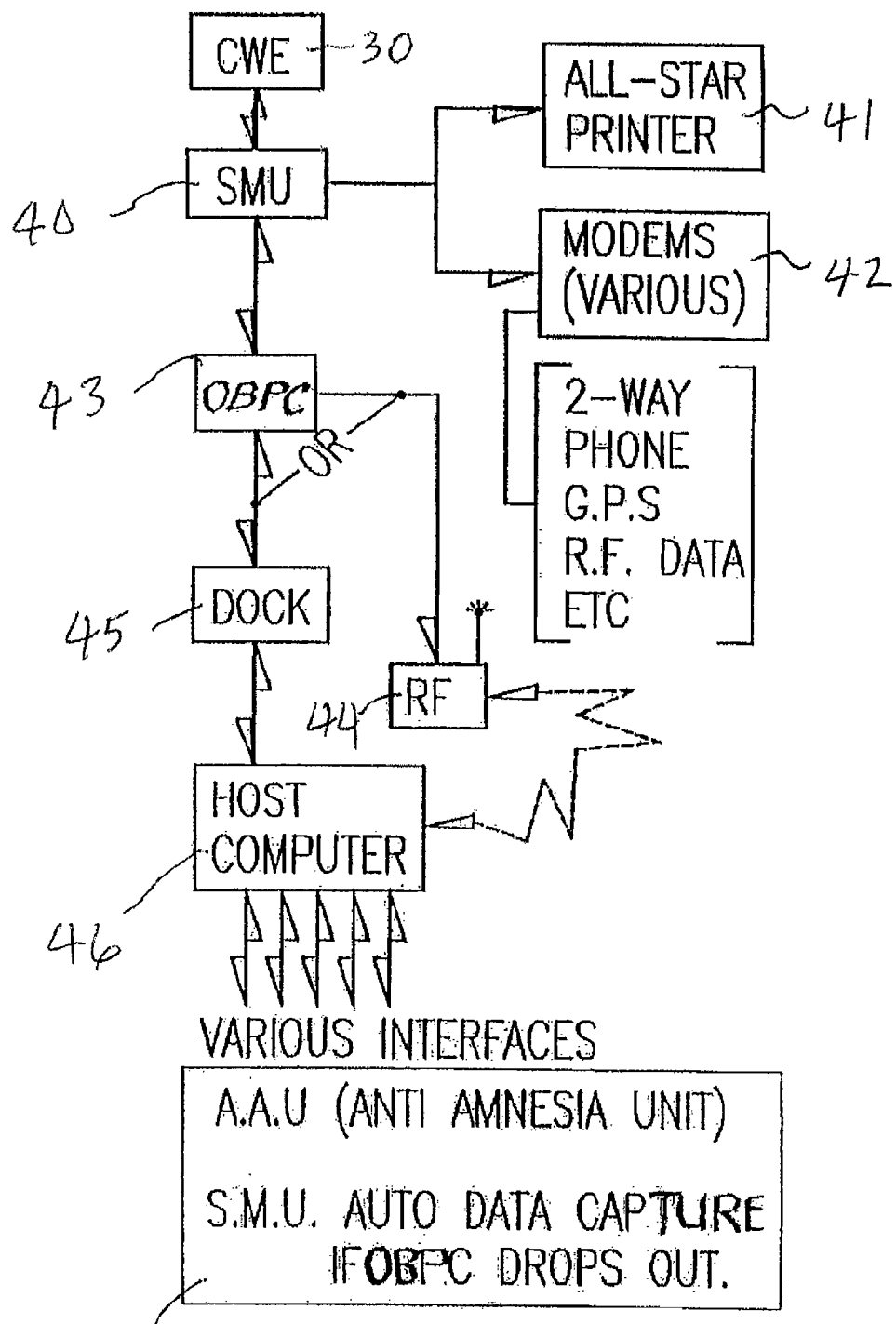
FIG. 8 is a schematic block diagram of a system of the invention shown coupled to other components for facilitating the downloading of data from the system of the invention.

FIG. 8 shows a block diagram of an alternative way to that of FIG. 7 in which a system 30 may be coupled to other components to allow data to be downloaded from the system 30. A serial memory unit (SMU) 40 is coupled to the system 30. A printer 41 and various communication devices 42 are connected to SMU 40. An on-board personal computer (OBPC) 43 is connected to the SMU 40 and this OBPC 43 is coupled to an RF transmitter 44 and a docking station 45. The docking station 45 allows a host computer 46 or other devices to be coupled to the OBPC 43 for downloading data. A memory unit 47 may be coupled to the computer 46 to provide for data downloaded from the system 30 to be backed up in case of failure of the OBPC 43.

The AAU illustrated in box 47 with an additional SMU, provides additional data back-up capabilities at the same time providing additional serial data ports to connect to various peripheral devices which are used by various operators of this system in various applications or end uses. The SMU/AAU 47 is also used to store the data which is collected when performing the tests.

Figure 9:
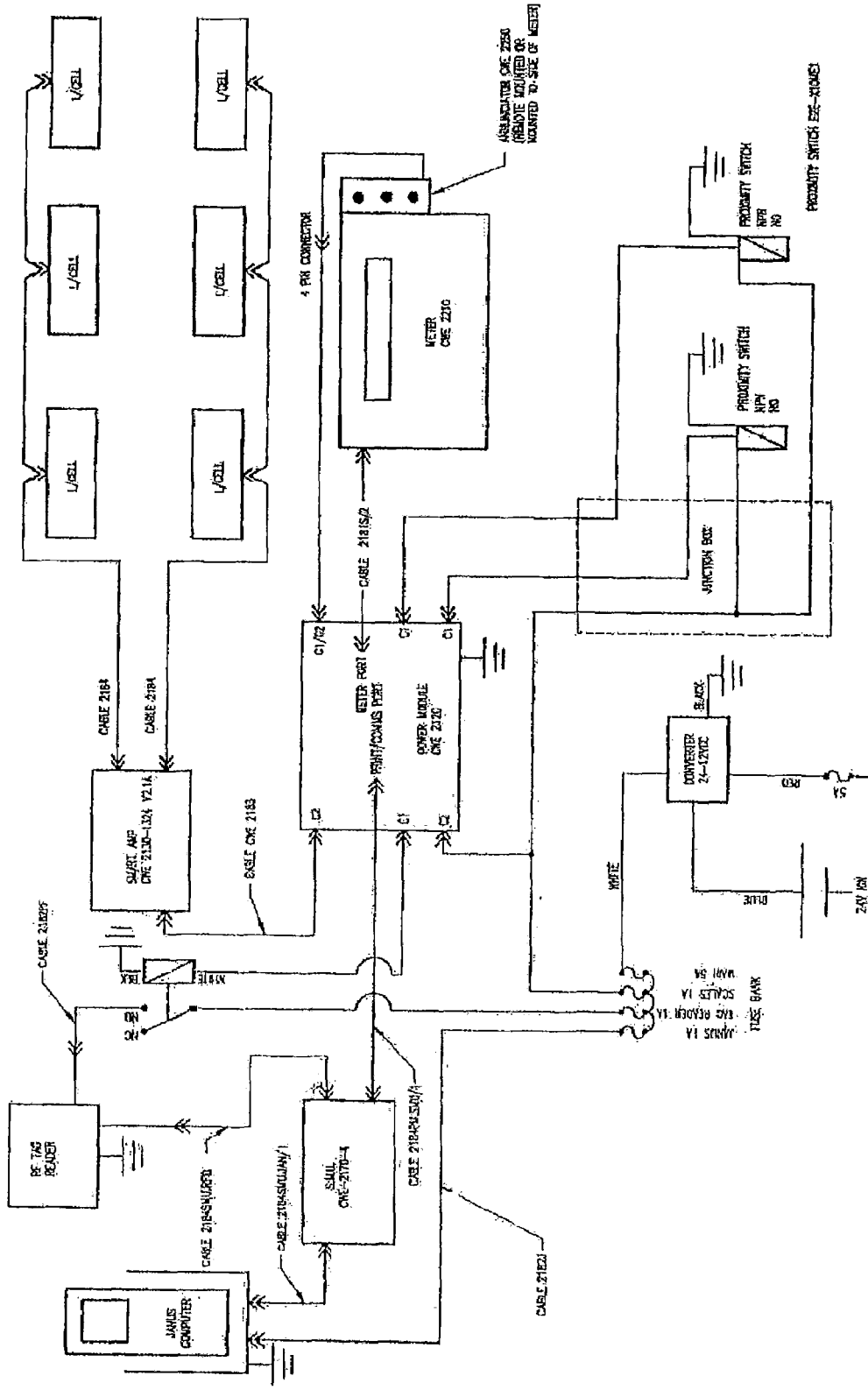
FIG. 9 is a detailed block diagram of the system of the invention illustrated in schematic form in FIGS. 7 and 8.

FIG. 9 is a detailed block diagram of the system of the invention illustrated in schematic form in FIGS. 7 and 8.

In the present specification and claims, the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A method for logging the performance of a vehicle suspension system by testing dynamic performance of at least one vehicle suspension system component, the method including the steps of:
   a. measuring the dynamic excursion of mass of an impulsive load with an electronic weighing system in response to a unit impulsive load, wherein the electronic weighing system is mounted onboard the vehicle and monitors the at least one suspension system component, and
   b. measuring an oscillation frequency of said at least one vehicle suspension system component in response to said unit impulsive load, and
   c. determining the dampening ratio of the at least one vehicle suspension system component using the dynamic excursions of mass, and the maximum oscillation frequency of the at least one vehicle suspension system component.

2. The method according to claim 1 wherein the electronic weighing system mounted on board the vehicle includes at least one load measuring element, associated with one or more vehicle suspension system components, each load measuring element associated with a signal amplifier, each signal amplifier associated with a central power module and a meter to display collected information.

3. The method according to claim 2 wherein the signal amplifiers used are adapted to store measurements collected by the step of measuring the dynamic excursion of mass and the step of measuring an oscillation frequency during a calibration test.

4. The method according to claim 2 wherein a central meter is provided to which all load measuring elements transmit data.

5. The method according to claim 2 wherein the meter is a multi-channel meter adapted to receive information on multiple channels, each of the channels adapted to receive data from an axle grouping.

6. The method according to claim 5 wherein up to eight load measuring elements provide information to the meter on each channel.

7. The method according to claim 2 wherein the electronic weighing system includes an on-board storage device to receive and record all information from all associated load measuring elements.

8. The method according to claim 7 wherein the on-board storage device includes a data log allowing the tracking of the information collected according to dates, times, and particular dynamic parameters comprising G-force and time, both of which can be either pre-set or varied to suit particular operating conditions.

9. The method according to claim 2 wherein the meter is adapted for communication with a tool for analysis of the collected information, and is associated with a communication means for transmitting and/or receiving information.

10. The method according to claim 2 further including a plurality of vehicles, each of said plurality of vehicles provided with a vehicle locating means.

11. The method according to claim 2, wherein the electronic weighing system further includes one or more remote interrogation units adapted to allow remote access to the meter provided in a vehicle, the remote interrogation units allowing the viewing and/or analysis of information collected.

12. The method according to claim 1 wherein the performance of the vehicle suspension system is logged over a standard road section at different times to test the performance of an individual axle or group of axles to an impulsive load.

13. The method according to claim 12 including the step of comparing the performance of the vehicle suspension system to predetermined standards.

14. The method according to claim 12 wherein the performance of the vehicle suspension system when the at least one vehicle suspension system component is new, is compared to performance at various periods throughout the life of the at least one vehicle suspension system component in order to ensure that the performance of the at least one vehicle suspension system component remains within predetermined standards.

15. The method according to claim 12 including a step test in which a specified height step downward is used to create a negative step input to the vehicle suspension system component for the purpose of determining damping ratio and fundamental frequency of axle-to-body bounce of the suspension.

16. The method according to claim 15 wherein the step test is conducted over a predetermined height step and also at a predetermined speed of passing over the step.

17. The method according to claim 16 further allowing the adaptation of measurements collected by the step of measuring the dynamic excursion of mass and the step of measuring an oscillation frequency to allow for differences in the speed and height of the predetermined height step when calculating the tested parameters.

18. The method according to claim 12 including a series of tests performed by driving the vehicle over a 50 mm bump at approximately 5 km/h to provide an approximation to a positive impulse signal applied to the suspension of the vehicle.

19. The method according to claim 12 including a test in which the variation in a mass signal is recorded as the vehicle travels along a normal, uneven road.

20. The method according to claim 19 wherein a location device is linked to the measurements collected by the step of measuring the dynamic excursion of mass and the step of measuring an oscillation frequency, to precisely locate the portion of road upon which the test was conducted for future comparison.

21. The method according to claim 12 wherein the performance of the vehicle suspension system is logged over a variable road section at different times, the position of the vehicle being identifiable at all times during the logging process, allowing data to be collected about the condition of the roads which the vehicle travels over.

22. The method according to claim 21 wherein the logging is triggered by the application of a particular preset magnitude impulsive load.

23. The method according to claim 22 wherein the location of the vehicle is ascertainable with precision using a locating means.

24. The method according to claim 1 wherein the impact loading of the vehicle is determined.

* * * * *